(12) United States Patent
Lee et al.

(10) Patent No.: US 6,259,744 B1
(45) Date of Patent: Jul. 10, 2001

(54) METHOD AND APPARATUS FOR MAPPING BITS TO AN INFORMATION BURST

(75) Inventors: Yumin Lee, Taipei (TW); Brian Keith Classon, Palatine; Joseph Michael Nowack, Buffalo Grove, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/583,380

(22) Filed: May 30, 2000

Related U.S. Application Data
(60) Provisional application No. 60/136,977, filed on Jun. 1, 1999.

(51) Int. Cl.[7] .............................. H04L 23/02; H04L 5/12
(52) U.S. Cl. ......................... 375/264; 375/296; 375/285
(58) Field of Search .................................... 375/296, 295, 375/264, 285, 278, 284; 370/207, 527; 714/756

(56) References Cited

U.S. PATENT DOCUMENTS

| | | | |
|---|---|---|---|
| 5,263,051 | * 11/1993 | Eyuboglu | 375/254 |
| 5,561,468 | * 10/1996 | Bryan et al. | 348/469 |
| 5,602,875 | * 2/1997 | Mantel et al. | 375/264 |
| 5,926,510 | * 7/1999 | Suzuki | 375/285 |

OTHER PUBLICATIONS

M. Austin, A. Buckley, C. Coursey, P. Hartman, R. Kobylinski, M.Majmundar, K. Raith, and J. Seymour; "Service and System Enhancements for TDMA Digital Cellular Systems"; IEEE Personal Communications, Jun. 1999, pp. 20–33.

JD Gibson; "The Mobil Communications Handbook" "The Pan–European Cellular System"; CRC Press and IEEE Press; pp. 399–405.

FG. Stremler; "Introduction to Communication Systems, Second Edition"; Addison–Wesley Publishing Co.; pp. 398–403.

DJ Rahikka, TE Tremain, VC Welch, JP Campbell Jr.; "Celp Coding for Land Mobile radio Applications"; ICASSP '90, Albuqauerque, NM; Apr. 3–6, 1990.

LE. Nelson; "Selective Signalling for Portable Applications"; VTC Denver, CO.; Mar. 22–24, 1978; p. 178–188.

* cited by examiner

*Primary Examiner*—Chi Pham
*Assistant Examiner*—Phuong Phu
(74) *Attorney, Agent, or Firm*—Douglas D. Fekete; Kenneth A. Haas

(57) ABSTRACT

A first group of bits (100, 102, 106), e.g., header symbols/bits, are interleaved to form a first group of interleaved bits. A second group of bits (104), e.g., data symbols/bits, are interleaved to form a second group of interleaved bits. The first and second groups of interleaved bits are mapped to an information burst (114). The first and second groups of interleaved bits may be mapped to the information burst relative to a group of known symbols (116) forming a training sequence. A disadvantaged bit location, i.e., a bit location within the mapping having a relative high probability of incurring a bit error, is identified and an advantaged bit location, i.e., a bit location within the mapping having a relatively low probability of incurring a bit error, is identified. A first group bit from the first group of interleaved bits mapped to the disadvantaged bit location is remapped to the advantaged bit location while a second group bit from the second group of interleaved bits mapped to the advantaged bit location is remapped to the disadvantaged bit location.

25 Claims, 6 Drawing Sheets

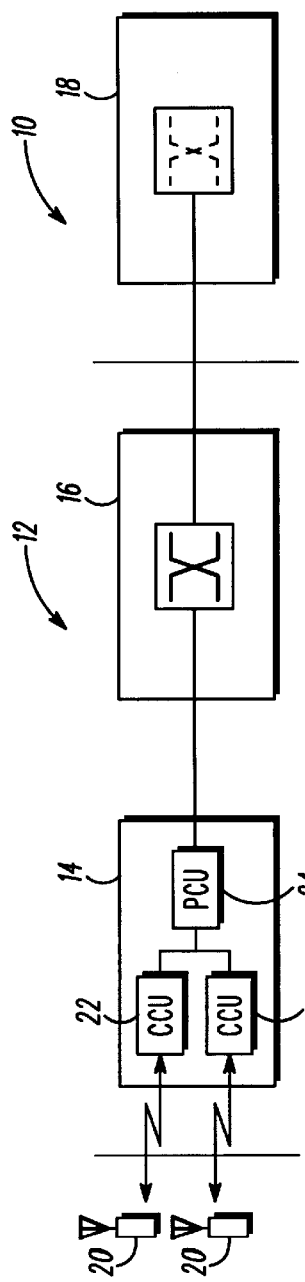
FIG. 1
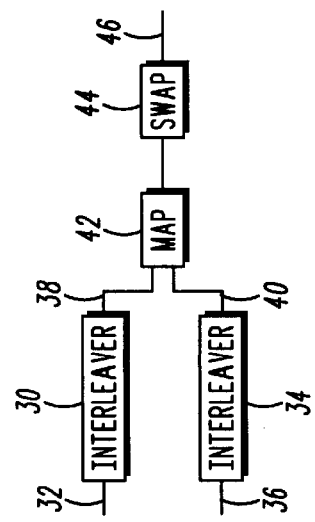
FIG. 2
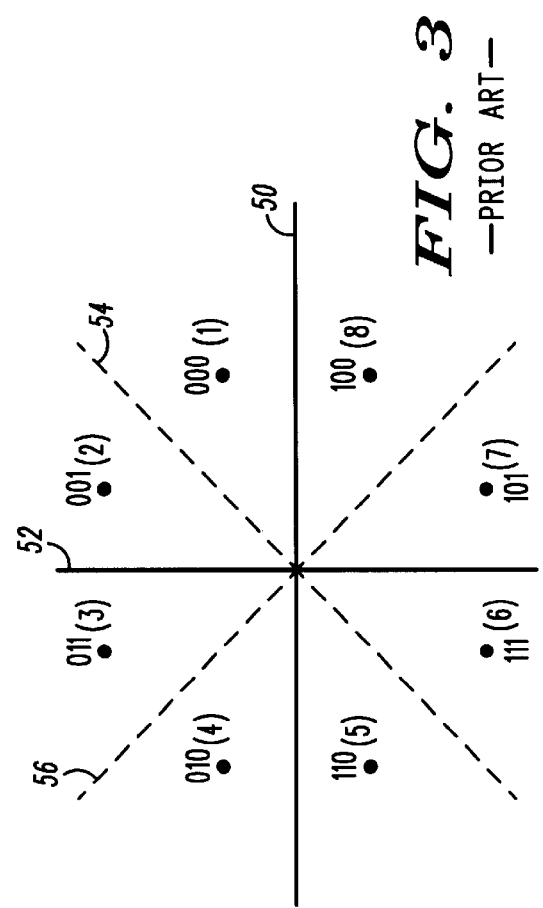
FIG. 3 —PRIOR ART—

METHOD AND APPARATUS FOR MAPPING BITS TO AN INFORMATION BURST

CROSS-REFERENCE TO RELATED APPLICATIONS

This application claims priority under 35 U.S.C. 119 to United States Provisional Application Ser. No. 60/136,977, filed Jun. 1, 1999 and entitled "Improved EGPRS Burst Mapping With Bit Skipping" the disclosure of which is hereby expressly incorporated herein by reference.

FIELD OF THE INVENTION

The present invention relates generally to digital communication systems and, more particularly, to a method and apparatus for mapping bits to an information burst in a digital wireless communication system.

BACKGROUND OF THE INVENTION

In digital communication systems, information, such as data or voice, is carried in an encoded form on a communication channel. In a time division multiplexing (TDM) communication system the communication channel is a time slot or frame into which a burst of encoded information is inserted. In addition to the information being communicated, the burst will also necessarily include additional encoded information, such as header information, control information, synchronization, training or optimization information, and the like, as is well known in the art. On the receiving end, the information burst is decoded to recover the communicated information. If the information is not decoded correctly, errors occur. The rate at which errors occur in the decoded information is referred to as the bit error rate (BER). A related measure of decoded information reliability is the block error rate (BLER) of a group of information bits, where a block error is defined as one or more bit errors within the group of information bits. Reducing the BER or BLER enhances system performance by, for example, increasing the amount of data that may be communicated or, for voice communications, enhancing the perceived quality of the voice communication.

In an equalized communication system that transmits bursts of information over a time varying channel, where a burst consists of one or more known sequences of training symbols (encoded and modulated information used for optimizing the equalizer) and unknown data and header symbols (i.e., encoded and modulated information), the channel BER profile is generally a function of the coded symbol position. For example, the channel BER of Enhanced Data Rates for GSM Evolution (EDGE) Enhanced General Packet Radio System (EGPRS) is higher at the beginning and the end of the information burst than near the middle of the information burst where the training symbols are located. Furthermore, the BER of every third bit is roughly twice the BER of the first and second bits. This "symbol asymmetry," due to the bit-to-symbol mapping scheme for Gray-coded 8-PSK (phase shift keying) used in EGPRS, occurs for many constellations and bit-to-symbol mappings.

The header symbols (throughout the term "header" is used to refer to a variety of header and control information including, without limitation stealing bits, coded USF (uplink status flag), coded RLC/MAC (Reliable Link Layer/ Medium Access Control) header information, and the like) typically carry crucial information. Errors within the data symbols may result in slightly decreased data rates or slightly degraded voice quality. Errors in the header symbols can result in a loss of the entire information burst, which can result in significantly decreased data rates or significantly decreased voice quality. Therefore, communication of the header symbols should be made as reliable as possible.

One method for minimizing the decoded BER of the header symbols includes placing the header symbols adjacent to the training sequence. This method results in minimizing the interleaver gain while maximizing the effect of the BER profile as described above. Another method includes interleaving the data and header together. This method results in maximizing the interleaver gain while minimizing the effect of the BER profile. Neither method is superior for all channel conditions, and each method may cause a significant degradation to the data decoded BER.

Thus, there is a need for a method and apparatus for mapping symbols to an information burst that minimizes header decoded BER over many channel conditions without degrading data decoded BER.

BRIEF DESCRIPTION OF THE DRAWINGS

FIG. 1 is a block diagram representation of a communication system in accordance with a preferred embodiment of the invention.

FIG. 2 is a functional block diagram representation of bit mapping apparatus in accordance with a preferred embodiment of the invention.

FIG. 3 is a bit-to-symbol map for 8-PSK modulation including Gray code mapping.

DETAILED DESCRIPTION OF THE PREFERRED EMBODIMENTS

Figure 4:
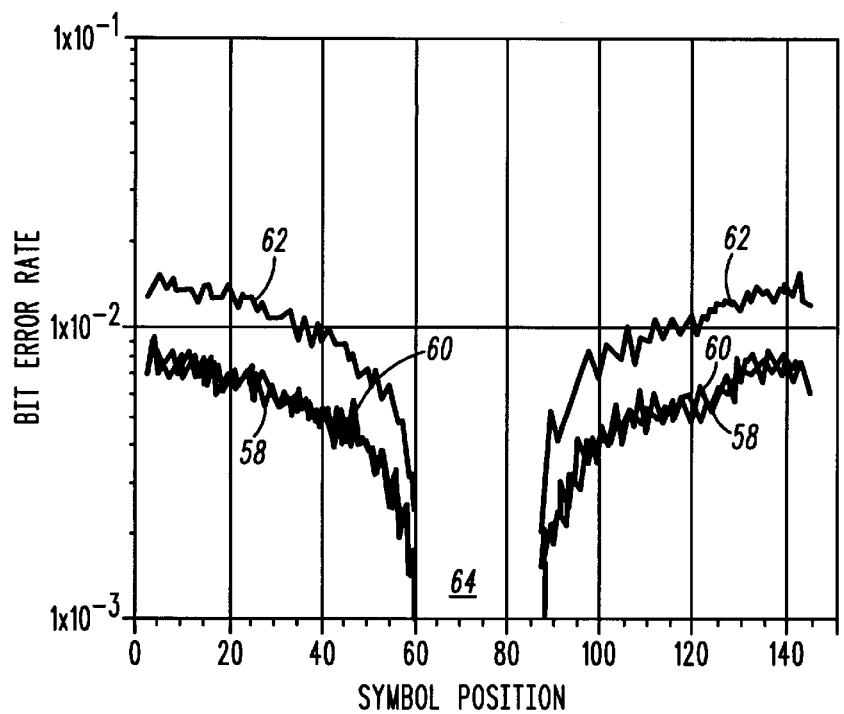
FIG. 4 is a graph illustrating bit error rate relative to symbol position for the 8-PSK modulation scheme illustrated in FIG. 3.

The invention exploits the position-dependant property of the bit error rate (BER), caused by proximity to the training symbols and symbol asymmetry, to greatly improve the reliability of fields that carry preferred information, e.g., header symbols/bits while minimally impacting the decoded data BER. The header bits are first mapped to an information burst in close proximity to a training sequence. The remaining information to be communicated, e.g., data bits, is then mapped to the information burst. Header bits mapped to bit locations having a high probability of incurring a bit error are relocated to bit locations occupied by data bits having a low probability of incurring a bit error. The displaced data bits are relocated to bit locations previously occupied by the header bits.

In a method according to a preferred embodiment of the invention a first group of bits, e.g., header symbols/bits, are interleaved to form a first group of interleaved bits. A second group of bits, e.g., data symbols/bits, are interleaved to form a second group of interleaved bits. The first and second groups of interleaved bits are mapped to an information burst. The first and second groups of interleaved bits may be mapped to the information burst relative to a group of known symbols forming a training sequence. A disadvantaged bit location, i.e., a bit location within the mapping having a relative high probability of incurring a bit error, is identified and an advantaged bit location, i.e., a bit location within the mapping having a relatively low probability of incurring a bit error, is identified. A first group bit from the first group of interleaved bits mapped to the disadvantaged bit location is remapped to the advantaged bit location while a second group bit from the second group of interleaved bits mapped to the advantaged bit location is remapped to the disadvantaged bit location.

In another preferred embodiment of the invention, the disadvantaged bit location and the advantaged bit location within the mapping are known a priori and the first group bit is mapped to the advantaged bit location and the second group bit is mapped to the disadvantaged bit location.

In an alternate preferred embodiment of the invention, the bit locations of the first group bit and the second group bit are swapped after mapping of the first group of interleaved bits and the second group of interleaved bits to the information burst.

An apparatus according to a preferred embodiment of the invention includes operatively coupled an interleaver, a bit mapper and a bit swapper. The interleaver separately interleaves the header bits and data bits to provide interleaved header bits and interleaved data bits. Alternatively, the interleaver may interleave the header bits together with the data bits. The bit mapper maps the interleaved header bits and interleaved data bits to an information burst relative to a training sequence. The bit swapper then moves header bits from bit locations having a relatively high probability of incurring a bit error to bit locations, occupied by data bits, having a relatively low probability of incurring a bit error. The bit swapper then locates the displaced data bits to the bit locations formerly occupied by the displaced header bits.

Referring to FIG. 1 of the drawings, a digital communication network 10 includes a radio access network 12 including a base station 14 and a base station controller 16. The radio access network 12 is coupled to a switch fabric 18, which may be a circuit switch network or a packet data network. The base station 14 provides wireless communication services to mobile stations 20 operating within a coverage area of the base station 14. Preferably the base station 14 operates in accordance with one or more wireless communication standards, including without limitation the Enhanced General Packet Radio System (EGPRS) specified in the Global System for Mobile Communications (GSM) standard. In this regard, the base station 14 may further implement Enhanced Data Rates for GSM Evolution (EDGE) protocols. It will be appreciated by one of ordinary skill in the art; however, that the present invention has application to virtually any communication system type that transmits bursts of information over a time-varying channel.

Within the base station 14 are channel codec units (CCU) 22 that are coupled to a packet control unit (PCU) 24. The PCU 24 is coupled to the base station controller 16, and hence to the remainder of the communication network 10. While shown as part of the base station 14, the PCU 24 may be associated with the base station controller 16 or with another entity of the communication network 10. Moreover, while two CCUs are shown, it will be appreciated the number of CCUs within the base station 14 will depend on the desired capacity of the base station 14. The PCU 24 provides control of the communication of data packets to and from the base station 14, as well as other functionality as described for EPGRS.

Each CCU 22 operates to demodulate and decode uplink signals received from a mobile station 20 and to encode and modulate downlink signals for transmission to the mobile station 20. The CCU 22 further operates to provide the inventive method described herein. While the invention will be described in terms of a downlink encoding and modulation process, and will be particularly described in terms of the EGPRS downlink Modulation Coding Scheme (MCS)-5 to MCS-9, the invention is easily extended to the EGPRS uplink, other MCSs or other communication systems, as will be appreciated by one having ordinary skill in the art.

Referring to FIG. 2, the functional elements of CCU 22 are illustrated in block diagram form. These functional elements are preferably implemented in computer code operated on by a processing unit within the CCU 22. Of course, the particular implementation, either by way of computer code or otherwise, is not critical to the invention, and any suitable implementation may be employed without departing from the fair scope of the invention. As shown in FIG. 2, a first interleaver 30 receives a stream of header bits 32 that are to be mapped to an information burst. A second interleaver 34 receives a stream of data bits 36 that are also to be mapped to the information burst. The output of the interleaver 30 and the interleaver 34 are interleaved header bits 38 and interleaved data bits 40, respectively. A bit mapper 42 maps the interleaved header bits 38 and the interleaved data bits 40 to the information burst, and relative to a training sequence of the information burst. Finally, a bit swapper 44 provides for swapping of certain bits, predominantly header bits, from bit locations having a relatively high probability of incurring bit errors with data bits in bit locations having a relatively low probability of incurring bit errors. The result is a bit mapped information burst 46, with improved header information reliability without significant data degradation.

While described as separate functional entities, it will be appreciated that the functionality of the interleaver 30 and the interleaver 34 may be combined into a single functional interleaver element. Moreover, this single element further may embody the functionality of the bit mapper 42. In such an embodiment of the invention, the header bits 32 and the data bits 36 may be interleaved and directly mapped to the information burst by this single functional element. Still further, and well within the scope of the invention, all of the above described functional elements, header interleaver 30, data interleaver 34, bit mapper 42 and bit swapper 44 may be combined such that the header bits 32 and the data bits 36 are directly sequenced to the information burst, with swapping of disadvantaged bit locations for advantaged bit locations for the header bits 32 accomplished during such mapping. Various other combinations and sub-combinations of the above-described functional elements may be envisioned, and such combinations would be well within the scope of the present invention.

Figure 5:
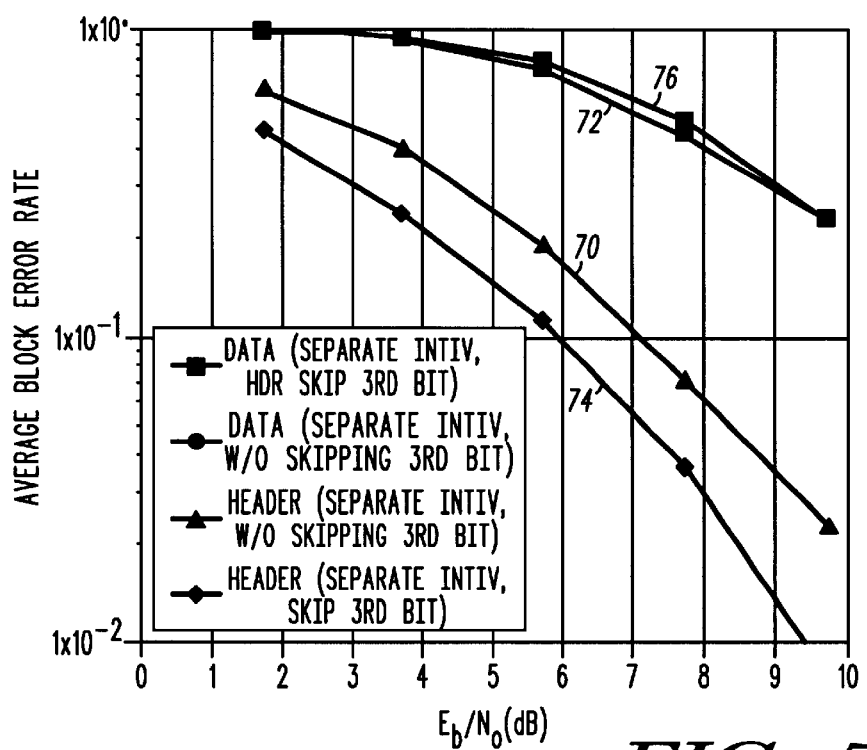
FIG. 5 is a graph illustrating average block error rate versus signal-to-noise ratio.

Referring to FIG. 3 and FIG. 4 it is possible to understand how the invention achieves the foregoing result. FIG. 3 illustrates a bit-to-symbol mapping for 8-PSK (phase shift keying) modulation. This particular mapping is Gray coded, with the leftmost bit in the symbol labeled bit 0, and the rightmost bit in the symbol labeled bit 2. The horizontal axis 50 illustrates the bit 0 decision line, the vertical axis 52 illustrates the bit 1 decision line and the 45 degree axes 54 and 56 illustrate the second bit decision lines. The probability of error of bit i in a symbol can be approximated as a function of the distance from the symbol to the closest bit i decision line. The approximation can be justified for many communication channels where the most likely symbol errors are closest to the correct symbol. Looking at symbol 1, it can be observed that there is a potential for a bit error due to selecting adjacent symbol 2 or symbol 8 in either bit 0 or bit 2. From symbol 2, it can be observed that there is a potential for a bit error due to selecting adjacent symbol I or symbol 3 in either bit 1 or bit 2. Continuing for each symbol Table 1 may be constructed, where an "X" indicates a potential for an error at the i-th bit of a symbol. As is evident from Table 1, there is a potential for error in bit 2 for every symbol, and one would expect to see increased probability of errors in bit 2. FIG. 4 bears this out, where traces 58 and 60 illustrate the block error rate by mapping position to the information burst for bit 0 and bit 1, while trace 62 illustrates the block error rate by mapping position to the information burst for bit 2. As can be seen, the block error rate for every mapping position of bit 2 is substantially higher than the block error rate for either bit 0 or bit 1. FIG. 4 further illustrates that for mapping positions nearer to the training sequence (positioned centrally in the mapping and indicated as 64), the block error rate declines. Thus, the interleaved header bits 38 are mapped in close proximity to the training sequence 64. Next, header bits that were mapped to locations corresponding to bit 2, a disadvantaged bit location, are swapped with data bits mapped to bit locations corresponding to bit 0 or bit 1, advantaged bit locations. In this manner, the decoded header BLER is improved. Unexpectedly, the decoded data BLER is not significantly degraded. This is illustrated in FIG. 5.

TABLE I

| Symbol   | Bit 0 | Bit 1 | Bit 2 |
|----------|-------|-------|-------|
| 000 (1)  | X     |       | X     |
| 001 (2)  |       | X     | X     |
| 011 (3)  |       | X     | X     |
| 010 (4)  | X     |       | X     |
| 110 (5)  | X     |       | X     |
| 111 (6)  |       | X     | X     |
| 101 (7)  |       | X     | X     |
| 100 (8)  | X     |       | X     |

Figure 6:
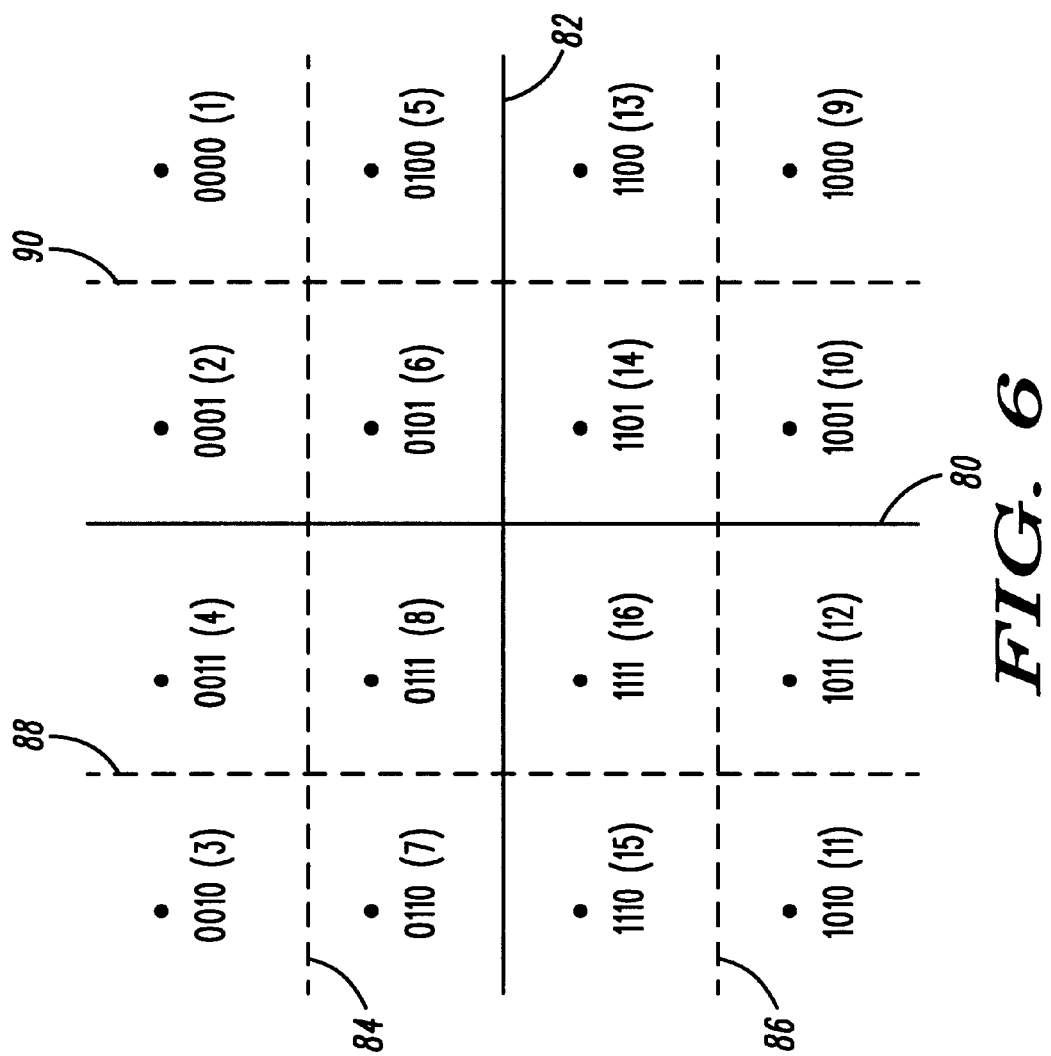
FIG. 6 is a bit-to-symbol map for 16-QAM modulation including Gray code mapping.

This "symbol asymmetry" is also present for other bit-to-symbol mappings for 8-PSK, and for other constellations such as 16-QAM. A bit-to-symbol mapping for 16-QAM is shown in FIG. 6. The particular mapping is Gray coded with the left most bit of a symbol labeled as bit 0 and the right most bit of a symbol labeled as bit 3. Axis 80 represents the bit 0 decision line, axis 82 represents the bit 2 decision line, axes 84 and 86 each represent the bit I decision lines and axes 88 and 90 represent the bit 3 decision lines. From the mapping illustrated in FIG. 6, Table II, below, may be constructed illustrating the potential for an error in the i-th bit of a symbol. As is seen from Table II, the approximate probability of an error is half for bit 0 and bit 2 as compared to either bit 1 or bit 3. Thus, one of ordinary skill in the art will readily appreciate that by applying the principles of the present invention, the decoded header BER for a communication system utilizing 16-QAM may be improved.

Referring to FIG. 5, the traces 70 and 72 illustrate average BLER versus signal-to-noise ratio for separately interleaved header and data bits, respectively, without application of the present invention, and the traces 74 and 76 illustrate average BLER versus signal-to-noise ratio for separately interleaved header and data bits, respectively, applying the principles of the present invention. As can be seen by comparing traces 70 and 74, there is substantial improvement in BLER. Comparing traces 72 and 76, it can be further seen that the improvement in decoded header BLER is achieved without a significant change in decoded date BLER.

TABLE II

| Symbol    | Bit 0 | Bit 1 | Bit 2 | Bit 3 |
|-----------|-------|-------|-------|-------|
| 0000 (1)  |       | X     |       | X     |
| 0001 (2)  |       | X     | X     | X     |
| 0010 (3)  |       | X     |       | X     |
| 0011 (4)  |       | X     | X     | X     |
| 0100 (5)  | X     | X     |       | X     |
| 0101 (6)  | X     | X     | X     | X     |
| 0110 (7)  | X     | X     |       | X     |
| 0111 (8)  | X     | X     | X     | X     |
| 1000 (9)  |       | X     |       | X     |
| 1001 (10) |       | X     | X     | X     |
| 1010 (11) |       | X     |       | X     |
| 1011 (12) |       | X     | X     | X     |
| 1100 (13) | X     | X     |       | X     |
| 1101 (14) | X     | X     | X     | X     |
| 1110 (15) | X     | X     |       | X     |
| 1111 (16) | X     | X     | X     | X     |

The present invention may be further illustrated by way of the following examples for the EGPRS downlink. The examples include data and header fields that are mapped over multiple bursts, with the header field consisting of multiple header subfields. Two of the header subfields are interleaved with an identity interleaver (i.e., not interleaved). Though not required, the examples place the header information into the advantaged positions substantially uniformly distributed on both sides and adjacent a single training sequence that is located within the middle of the burst. The header information need not be mapped uniformly with respect to the training sequence, nor does the training sequence need to reside centrally within the burst. Moreover, there may exist additional training sequences within the burst, and portions of the header information may be mapped with respect to each of these training sequences so as to take advantage of the reduced probability for bit errors resulting from the information being mapped near to the one or more training sequences. Additional fields other than data, header, and training are often found in TDM communication systems (guard, preamble, etc)—the examples include guard fields at the beginning and end of the burst. The following are examples of the application of the present invention to a TDM communication system, and as such, these examples should not be taken as limiting of the invention.

First Example for MCS-5 and MCS-6

Figure 7:
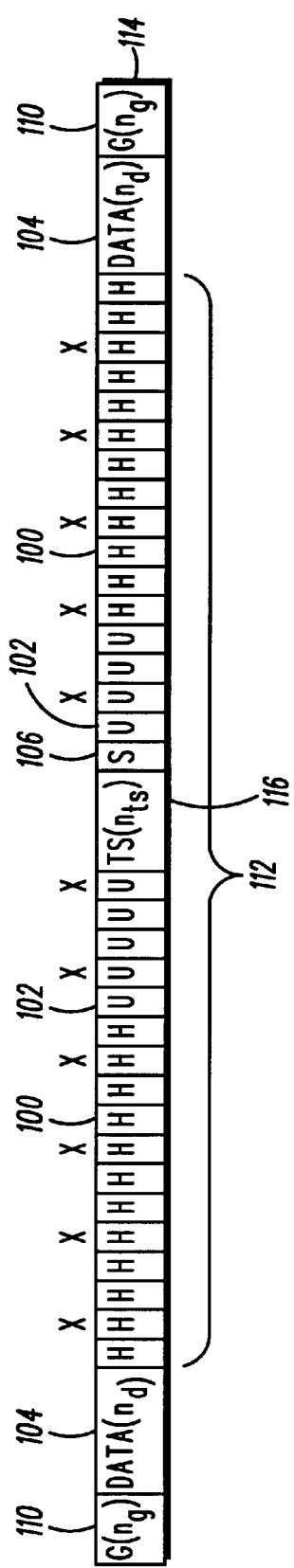
FIG. 7 is a diagram illustrating an initial bit mapping to an information burst in accordance with a preferred embodiment of the invention.
Figure 8:
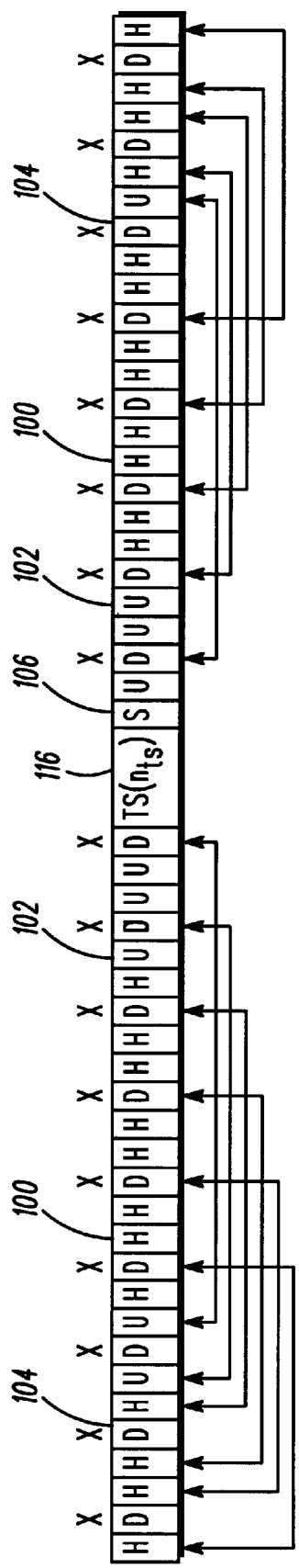
FIG. 8 is a diagram illustrating bit swapping subsequent to the bit mapping illustrated in FIG. 7.

Referring to FIGS. 7 and 8, let h(i), i=0,1, . . . , 95 be coded RLC/MAC header bits 100, u(i), i=0,1, . . . , 35 be coded USF bits 102, d(i), i=0,1, . . . , 1255 be coded data bits 104, sb(i), i=0,1,2,3 be stealing bits 106, g(i), i=0,1, . . . $n_g-1$ be guard bits 110 and e(B,i), i=0,1, . . . , 347 be the bits in the B-th burst (B=0,1,2,3) of a block. The header 112 includes the header bits 100, USF bits 102 and stealing bits 106. The $3^{rd}$ bit locations, or disadvantaged bit locations within the header 112 are known a priori and are designated with an "X." In accordance with a preferred embodiment of the invention, the bits are mapped to an information burst 114 as follows:

Step 1: Interleave RLC/MAC Header

The coded RLC/MAC header is interleaved (scrambled) using any interleaving algorithm. For example, for i=0, 1, ..., 95, let ĥ(j)=h(i), where $$j = 24 \times (i \bmod 4) + 2 \times \left(\left(5\left\lfloor\frac{i}{8}\right\rfloor\right) \bmod 12\right) + \left\lfloor\frac{i \bmod 8}{4}\right\rfloor$$

Step 2: Interleave RLC Data

The RLC data is interleaved (scrambled) using any interleaving algorithm. For example, for i=0,1, ..., 1255, let d̂(j)=d(i), where $$j = 314 \times (i \bmod 4) + 2 \times ((49i) \bmod 157) + \left\lfloor\frac{i \bmod 8}{4}\right\rfloor$$

Step 3: Straightforward Mapping (FIG. 7)

For B=0,1,2,3, let $$e(B, i) = \begin{cases} \hat{d}(314B+i), & \text{for } i = 0, 1, \ldots, 156 \\ \hat{h}(24B+i-157), & \text{for } i = 157, 158, \ldots, 168 \\ u(9B+i-169), & \text{for } i = 169, 170, 171, 172, 173 \\ sb(B), & \text{for } i = 174 \\ u(9B+i-170), & \text{for } i = 175, 176, 177, 178 \\ \hat{h}(24B+i-167), & \text{for } i = 179, 180, \ldots, 190 \\ \hat{d}(314B+i-34), & \text{for } i = 191, 192, \ldots, 347 \end{cases}$$

Note that the important bits 112 (stealing bits, coded USF, and coded RLC/MAC header) are mapped close to a training sequence 116. Mapping is illustrated for a single burst of the n possible bursts, where each additional burst is substantially similar.

Step 4: Bit Swapping (FIG. 8)

For B=0,1,2,3,

Swap e(B, 148) with e(B, 158);
Swap e(B, 150) with e(B, 161);
Swap e(B, 151) with e(B, 164);
Swap e(B, 153) with e(B, 167);
Swap e(B, 154) with e(B, 170);
Swap e(B, 156) with e(B, 173);
Swap e(B, 176) with e(B, 192);
Swap e(B, 179) with e(B, 193);
Swap e(B, 182) with e(B, 195);
Swap e(B, 185) with e(B, 196);
Swap e(B, 188) with e(B, 198).

Note that after this step is performed, none of the coded header and USF bits occupy the disadvantaged third bit "X".

Second Example for MCS-5 and MCS-6

Figure 9:
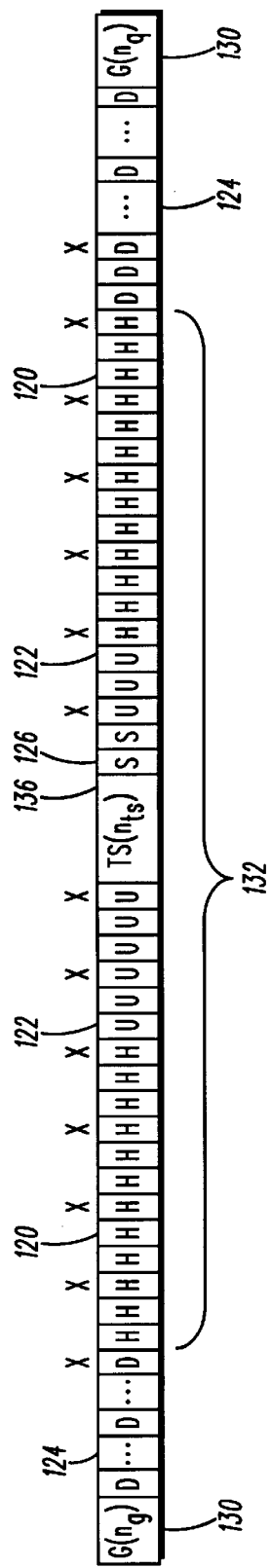
FIG. 9 is a diagram illustrating an initial bit mapping to a burst in accordance with an alternate preferred embodiment of the invention.
Figure 10:
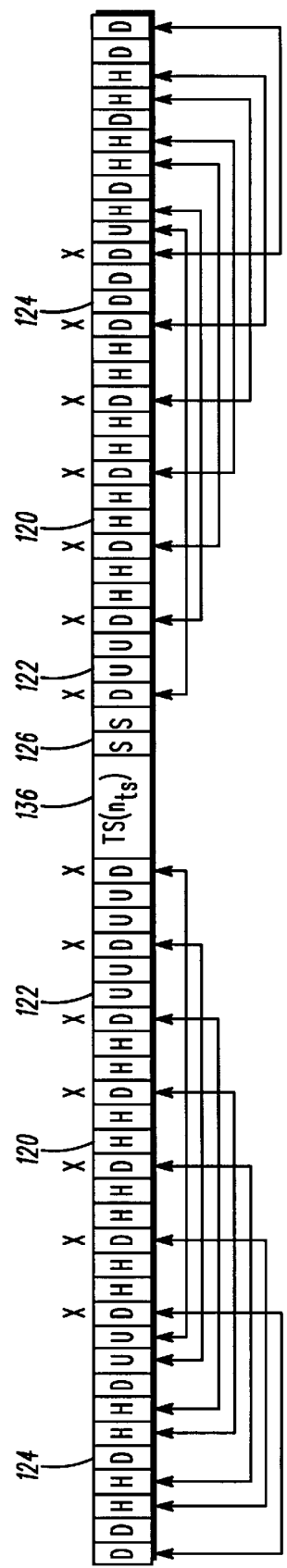
FIG. 10 is a diagram illustrating bit swapping subsequent to the bit mapping illustrated in FIG. 9.

Referring to FIGS. 9 and 10, let h(i), i=0,1, ..., 99 be coded RLC/MAC header bits 120, u(i), i=0,1, ..., 35 be coded USF bits 122, d(i), i=0,1, ..., 1247 be coded data bits 124, sb(i), i=0,1, ..., 7 be stealing bits 126, g(i), i=0, 1, ... $n_g$–1 be guard bits 130 and e(B,i), i=0,1, ..., 347 be the bits in the B-th burst (B=0,1,2,3) of a block. The header 132 includes the header bits 120, USF bits 122 and stealing bits 126. The $3^{rd}$ bit locations, or disadvantaged bit locations within the header 132 are known a priori and are designated with an "X." In accordance with a preferred embodiment of the invention, the bits are mapped to an information burst 134 as follows:

Step 1: Interleave RLC/MAC Header

The coded RLC/MAC header is interleaved (scrambled) using any interleaving algorithm. For example, for i=0, 1, ..., 99, let ĥ(j)=h(i), where j=25(i mod 4)+((17i) mod 25)

Step 2: Interleave RLC Data

The RLC data is interleaved (scrambled) using any interleaving algorithm. For example, for i=0,1, ..., 1247, let d̂(j)=d(i), according to an explicit relation given in a table. The table may be constructed by defining a block interleaver with a 1392 bit block size (data plus header), removing data positions that will be mapped to header positions (Step 3 below), and renumbering to fill out the gaps without changing the relative order.

Step 3: Straightforward Mapping (FIG. 9)

For B=0,1,2,3, let $$e(B, i) = \begin{cases} \hat{d}(312B+i), & \text{for } i = 0, 1, \ldots, 155 \\ \hat{h}(25B+i-156), & \text{for } i = 156, 157, \ldots, 167 \\ u(9B+i-168), & \text{for } i = 168, 169, 173 \\ sb(2B+i-174), & \text{for } i = 174, 175 \\ u(9B+i-170), & \text{for } i = 176, 177, 178 \\ \hat{h}(25B+i-167), & \text{for } i = 179, 180, \ldots, 191 \\ \hat{d}(312B+i-36), & \text{for } i = 192, 193, \ldots, 347 \end{cases}$$

Note that the important bits 132 (stealing bits, coded USF, and coded RLC/MAC header) are mapped close to a training sequence 136. Mapping is illustrated for a single burst of the n possible bursts, where each additional burst is substantially similar.

Step 4: Bit Swapping (FIG. 10)

For B=0,1,2,3,

Swap e(B, 142) with e(B, 155);
Swap e(B, 144) with e(B, 158);
Swap e(B, 145) with e(B, 161);
Swap e(B, 147) with e(B, 164);
Swap e(B, 148) with e(B, 167);
Swap e(B, 150) with e(B, 170);
Swap e(B, 151) with e(B, 173);
Swap e(B, 176) with e(B, 195);
Swap e(B, 179) with e(B, 196);
Swap e(B, 182) with e(B, 198);
Swap e(B, 185) with e(B, 199);
Swap e(B, 188) with e(B, 201);
Swap e(B, 191) with e(B, 202);
Swap e(B, 194) with e(B, 204).

Note that after this step is performed, none of the coded header and USF bits occupy the disadvantaged third bit "X".

Example for MCS-7, MCS-8 and MCS-9

Figure 11:
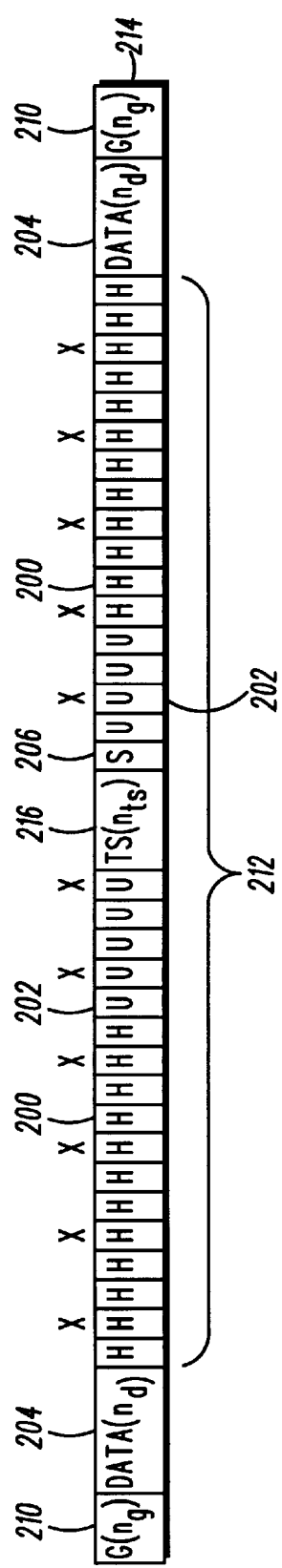
FIG. 11 is a diagram illustrating an initial bit mapping to a burst in accordance with an alternate preferred embodiment of the invention.
Figure 12:
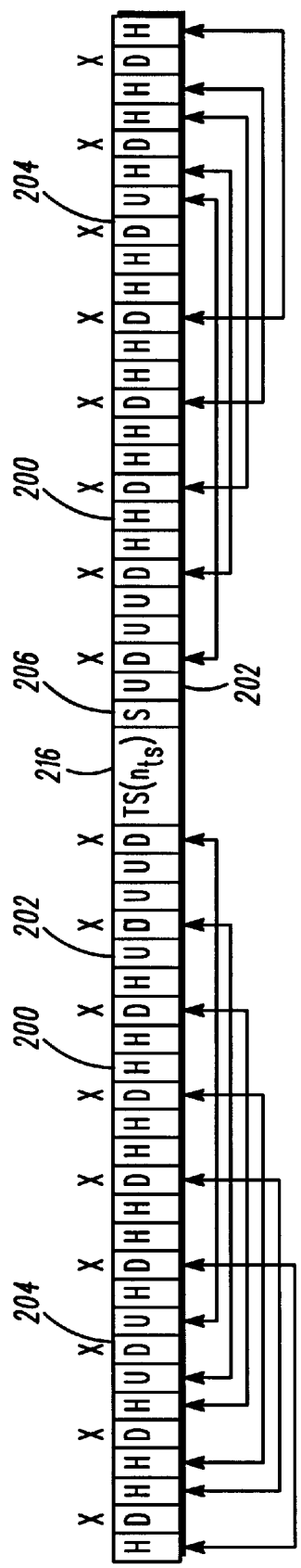
FIG. 12 is a diagram illustrating bit swapping subsequent to the bit mapping illustrated in FIG. 11.

Referring to FIGS. 11 and 12, let h(i), i=0,1, ..., 127 be the coded RLC/MAC header bits 200, u(i), i=0,1, ..., 35 be the coded USF bits 202, d(i), i=0,1, ..., 1223 be the coded data bits 204, sb(i), i=0,1,2,3 be the stealing bits 206, g(i), i=0,1, ... $n_g$–1 be guard bits 210 and e(B,i), i=0,1, ..., 347 be the bits in the B-th burst (B=0,1,2,3) of a block. The header 212 includes the header bits 200, USF bits 202 and stealing bits 206. The $3^{rd}$ bit locations, or disadvantaged bit locations within the header 212 are known a priori and are designated with an "X." In accordance with a preferred embodiment of the invention, the bits are mapped to an information burst 214 as follows:

Step 1: Interleave RLC/MAC Header

The coded RLC/MAC header is interleaved (scrambled) using any interleaving algorithm. For example, for i=0, 1, ..., 127, let ĥ(j)=h(i), where $$j = 11 \times (i \bmod 12) + \left\lfloor \frac{i}{12} \right\rfloor.$$

Step 2: Interleave RLC Data

The RLC data is interleaved (scrambled) using any interleaving algorithm. For example, for i=0,1, ..., 1223, let d̂(j)=d(i), where $$j = \begin{cases} 306 \times (i \bmod 4) + 2 \times ((49i) \bmod 153) + \left\lfloor \frac{i \bmod 8}{4} \right\rfloor & \text{for } MCS-7 \\ 306 \times \left(2\left\lfloor \frac{i}{612} \right\rfloor + (i \bmod 2)\right) + 2 \times \left((49i) \bmod 153 + \left\lfloor \frac{i \bmod 8}{4} \right\rfloor\right) & \text{for } MCS-8 \text{ and } MCS-9 \end{cases}$$

Step 3: Straightforward Mapping (FIG. 11)

For B=0,1,2,3, let $$e(B, i) = \begin{cases} \hat{d}(306B + i), & \text{for } i = 0, 1, \ldots, 152 \\ \hat{h}(32B + i - 153), & \text{for } i = 153, 154, \ldots, 168 \\ u(9B + i - 169), & \text{for } i = 169, 170, 171, 172, 173 \\ sb(B), & \text{for } i = 174 \\ u(9B + i - 170), & \text{for } i = 175, 176, 177, 178 \\ \hat{h}(32B + i - 163), & \text{for } i = 179, 180, \ldots, 194 \\ \hat{d}(306B + i - 42), & \text{for } i = 195, 196, \ldots, 347 \end{cases}$$

Note that the important bits 212 (stealing bits, coded USF, and coded RLC/MAC header) are mapped close to a training sequence 216. Mapping is illustrated for a single burst of the n possible bursts, where each additional burst is substantially similar.

Step 4: Bit swapping (FIG. 12)

For B=0,1,2,3,

Swap e(B, 142) with e(B, 155);
Swap e(B, 144) with e(B, 158);
Swap e(B, 145) with e(B, 161);
Swap e(B, 147) with e(B, 164);
Swap e(B, 148) with e(B, 167);
Swap e(B, 150) with e(B, 170);
Swap e(B, 151) with e(B, 173);
Swap e(B, 176) with e(B, 195);
Swap e(B, 179) with e(B, 196);
Swap e(B, 182) with e(B, 198);
Swap e(B, 185) with e(B, 199);
Swap e(B, 188) with e(B, 201);
Swap e(B, 191) with e(B, 202);
Swap e(B, 194) with e(B, 204).

Note that after this step is performed, none of the coded header and USF bits occupy the disadvantaged third bit "X".

The present invention has been described and illustrated in terms of several preferred embodiments, several alternate preferred embodiments and several examples. It will be appreciated that invention may be otherwise embodiment than as described herein without departing from the fair scope of the present invention. The described embodiments and examples are intended only to be illustrative of the invention, and not limiting thereof, the full and fair scope of invention being set forth in the subjoined claims.

We claim:

1. A method of mapping bits to an information burst comprising the steps of:
   interleaving a first group of bits to provide a first group of interleaved bits;
   mapping the first group of interleaved bits to the information burst;
   interleaving a second group of bits to provide a second group of interleaved bits;
   mapping the second group of interleaved bits to the information burst;
   identifying a first group bit from the first group of interleaved bits mapped to a disadvantaged bit position;
   identifying a second group bit from the second group of interleaved bits mapped to an advantaged bit position; and
   inserting the first group bit into the advantaged bit position and the second group bit into the disadvantaged bit position.

2. The method of claim 1, wherein the first group of interleaved bits and the second group of interleaved bits are mapped to the information burst relative to a training sequence.

3. The method of claim 2, wherein the first group of interleaved bits are mapped to the information burst proximal to the training sequence.

4. The method of claim 1, wherein the disadvantaged bit position and the advantaged bit position are known prior to the step of mapping.

5. The method of claim 4, wherein the step of inserting the first group bit into the advantaged bit position is accomplished during the step of mapping the first group of interleaved bits to the information burst.

6. The method of claim 4, wherein the step of inserting the second group bit into the advantaged bit position is accomplished during the step of mapping the second group of interleaved bits to the information burst.

7. The method of claim 1, wherein the step of inserting the first group bit into the advantaged bit position and the second group bit into the disadvantaged bit position comprises the step of swapping bit positions between the first group bit and the second group bit.

8. The method of claim 1, wherein the first group of bits comprise header bits.

9. The method of claim 1, wherein the second group of bits comprise data bits.

10. A method of mapping bits to an information burst of a time varying communication channel comprising the steps of:
    interleaving a first group of bits and a second group of bits to provide interleaved bits;
    mapping the interleaved bits to the information burst relative to a training sequence;
    identifying a first group bit from the interleaved bits mapped to a disadvantaged bit position;
    identifying a second group bit from the interleaved bits mapped to an advantaged bit position; and
    inserting the first group bit into the advantaged bit position and the second group bit into the disadvantaged bit position.

11. The method of claim 10, wherein the disadvantaged bit position and the advantaged bit position are known prior to the step of mapping.

12. The method of claim 10, wherein the step of inserting the first group bit into the advantaged bit position is accomplished during the step of mapping.

13. The method of claim 12, wherein the step of inserting the second group bit into the advantaged bit position is accomplished during the step of mapping.

14. The method of claim 10, wherein the step of inserting the first group bit into the advantaged bit position and the second group bit into the disadvantaged bit position comprises the step of swapping bit positions between the first group bit and the second group bit.

15. The method of claim 10, wherein the first group of bits comprise header bits.

16. The method of claim 10, wherein the second group of bits comprise data bits.

17. A method of mapping bits to an information burst of a time varying communication channel comprising the steps of:

mapping a first group of interleaved bits to the information burst;

mapping a second group of interleaved bits to the information burst;

selectively interleaving bits of the first group of interleaved bits with bits of the second group of interleaved bits based upon a probability of incurring a bit error at the locations of the bits of the first group.

18. The method of claim 17, wherein the step of mapping a first group of interleaved bits to the information burst comprises mapping the first group of interleaved bits relative to a training sequence.

19. The method of claim 17, wherein the locations of the bits of the first group to be selectively interleaved are known a priori.

20. The method of claim 17, wherein the first group of interleaved bits comprise header bits.

21. The method of claim 17, wherein the second group of interleaved bits comprise data bits.

22. An apparatus for mapping bits to an information burst of a communication channel comprising:

an interleaver coupled to receive a first group of bits to be mapped to the information burst and a second group of bits to be mapped to the information burst and to provide interleaved bits, a bit mapper coupled the interleaver to receive the interleaved bits and being operable to map the interleaved bits to the information burst relative to a training sequence of the information burst, and a bit swapper coupled to the bit mapper, the bit swapper operable to identify a first group bit of the first group of bits mapped to bit locations having a relatively high probability of incurring bit errors and to identify a second group bit of the second group of bits mapped to bit locations having a relatively low probability of incurring bit errors and to relocate the first group bit to the bit location of the second group bit and the second group bit to the location of the first group bit.

23. The apparatus of claim 22, wherein the first group bits comprise header bits.

24. The apparatus of claim 22, wherein the second group bits comprise data bits.

25. The apparatus of claim 22, wherein the communication channel comprises a time divisional multiple access communication channel.

* * * * *